Patented Jan. 27, 1953

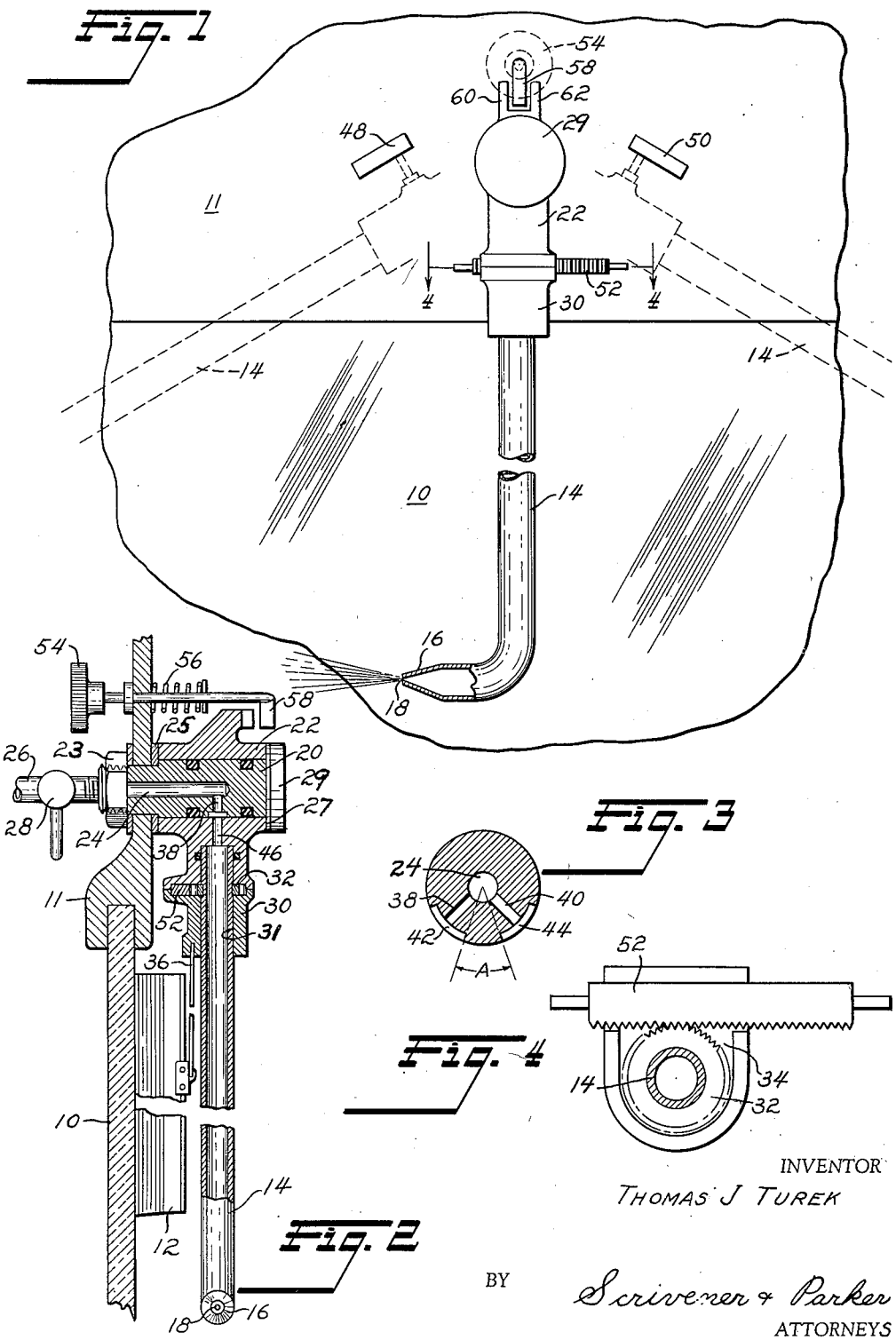

2,626,416

UNITED STATES PATENT OFFICE 2,626,416

AIR PRESSURE OPERATED WINDSHIELD WIPER

Thomas J. Turek, Elyria, Ohio, assignor to Bendix-Westinghouse Automotive Air Brake Company, Elyria, Ohio, a corporation of Delaware Application May 3, 1950, Serial No. 159,796

12 Claims. (Cl. 15—253)

This invention relates to windshield wipers and more particularly to a construction wherein the squeegee or windshield wiper blade may be oscillated by a source of compressed air.

Various types of windshield wipers have heretofore been provided for motor vehicles, but for the most part these have been operated by the vacuum derived from the intake manifold or by an electric motor. In the first case, it has been found that the speed of oscillation of the wiper element is greatly affected by the engine load, thus resulting in ineffective clearing of the windshield under certain conditions of vehicle operation. In the case where an electric motor is employed as the source of power, the vehicle battery is subjected to a considerable drain of energy, and this fact has necessitated the use of batteries and generators of larger capacity, thereby increasing the initial expense as well as the cost of operation.

A large number of vehicles at the present time are equipped with braking systems operated by compressed air, and several attempts have heretofore been made to utilize the existing source of air pressure for the operation of the windshield wipers. In these prior arrangements however, the air pressure is utilized for the operation of various types of air motors and turbines which are relatively large and bulky and hence are not well suited for automotive vehicle installation. These prior devices moreover require frequent servicing and the cost of proper maintenance is therefore increased.

It is accordingly an object of the present invention to provide a pressure operated windshield wiper which is constructed and arranged as to avoid the objections and disadvantages referred to above.

Another object is to provide a novel windshield wiper construction which possesses a substantially constant speed of oscillation at all times, is compact and hence readily adaptable to automotive vehicle installation, and is relatively simple in its construction and manner of operation.

A further object comprehends a windshield wiper of the above type which functions according to the reaction jet principle, the arrangement being such that the wiper element may be effectively oscillated without serious loss of air from the storage reservoir.

Still another object is to provide a jet type of windshield wiper which includes a novel construction for reversing the action of the jet in order to impart oscillatory movement to the wiper blade.

A still further object includes the provision of a novel valve construction for conducting air pressure to the jet, such construction being of such nature as to be efficiently operable throughout long periods of use and without requiring frequent servicing operations.

Other objects and novel features of the invention will appear more fully hereinafter from the following detailed description when taken in connection with the accompanying drawing illustrative of one form of the invention. It is to be expressly understood however, that the drawing is utilized for purposes of illustration only and is not designed as a definition of the limits of the invention, reference being had for this purpose to the appended claims.

In the drawing, wherein similar reference characters refer to similar parts throughout the several views, Fig. 1 is a front view of an air pressure operated windshield wiper assembly constructed in accordance with the principles of the present invention;

Fig. 2 is a side view partly in section of the assembly of Fig. 1;

Fig. 3 is an axial sectional view of the supporting shaft and illustrates the valving arrangement; and Fig. 4 is a sectional view of the jet tube reversing mechanism taken substantially along line 4—4 of Fig. 1.

Referring more particularly to Figs. 1 and 2, an air pressure operated windshield wiper embodying the present invention is illustrated therein as being associated with a vehicle windshield 10 provided with a suitable support 11, the windshield wiper construction including an oscillatory squeegee or wiper blade 12 and a reaction jet tube 14 operating in a manner which will appear more fully hereinafter.

As heretofore stated, the present invention functions in accordance with the reaction jet principle, and to this end, the jet tube 14 is supplied with air under pressure which is exhausted to the atmosphere through a nozzle 16 provided with a relatively small orifice 18. More particularly, a shaft 20 is secured to the support 11 by a nut 23 and is provided with an axial bore or passage 24 which communicates with a compressed air conduit 26 having a manually operable shut-off valve 28 therein. Shaft 20 is so mounted as to extend outwardly of the support 11 and constitutes an axle or pivot for an upper housing section 22, the latter being maintained in the position shown, and between a washer 25 and a Belleville spring 27 as by means of a cap 29 suitably secured to or formed integrally with the shaft 20. The upper end of the jet tube 14 is rotatably mounted in a bore 31 provided in a lower housing section 30 which is suitably connected with the upper section 22, and the tube 14 is secured against longitudinal movement in the bore by means of a gear 32, secured to the tube and positioned within a chamber 34 formed by the housing sections 22 and 30. A supporting arm 36, carrying the blade 12, is fixed to the housing section 30, and from this construction, it will be seen that the assembly constituting the housing sections 22 and 30, the tube 14 and the wiper blade 12 is supported for oscillation on the shaft 20 and is positioned so that the blade 12 contacts the windshield 10.

A novel construction is provided for oscillating the jet 14 and blade 12 to preselected positions and for reversing the movement of these parts when each position is reached, in order that the blade 12 may be oscillated back and forth to clear the windshield. In the form of the invention shown, such construction also includes a novel valving arrangement which is arranged to utilize the inertia of the oscillating parts for the purpose of conserving air pressure. More particularly, the valving arrangement includes a pair of passages 38 and 40, formed in the shaft 20 and extending radially outwardly to terminate in enlarged chambers 42 and 44, the latter selectively communicating with a bore 46 formed in the casing section 22 for the purpose of conducting air pressure from the conduit 26 to the jet tube 14 depending upon the relative position between housing section 22 and the shaft 20. From this construction, it will be understood that when the tube 14 passes through the distance A, see Fig. 3, flow of air pressure from the chambers 42 or 44 to the bore 46 will be cut off. Beyond the limits of this distance either of the chambers 42 or 44 may be connected with the bore 46 in order to provide air pressure for the oscillation of the tube 14 and the wiper blade 12. Thus in passing through the distance A, air pressure is conserved and the inertia of the moving parts 12, 14, 22 and 30 is utilized to carry these parts to positions where the chambers 42 or 44 are connected with the bore 46.

Referring to Fig. 1, it will be observed that the nozzle 16 is so arranged as to exhaust air in a direction substantially parallel to the windshield 10. This action causes movement of the nozzle 16 to the right by reason of the reaction afforded by the exhausting air. In order to reverse the position of the nozzle and thereby effect oscillation of the tube 14 and wiper blade 12, a pair of spaced stops 48 and 50 are mounted on the support 11 and are arranged to be selectively engaged by opposite ends of a rack 52, the latter being slidably mounted in the housing sections 22 and 30 and being provided with teeth in constant meshing engagement with the teeth on the gear 32. Thus as the jet tube 14 moves to the right, as above indicated, the right hand end of the rack 52 engages the stop 50 in order to rotate the tube 14, through gear 32, approximately 180 degrees. This reverses the position of the tube 14 and the nozzle 16 so that these parts will move to the left, as viewed in Fig. 1, through the reaction caused by the exhausting air, until the left hand end of the rack 52 engages the stop 48 to again reverse the tube 14 and nozzle 16 and cause movement of these parts to the position illustrated. It will therefore be understood that the cooperation between the rack 52 and the stops 48 and 50 serves to reverse the jet tube 14 at the selected limits in order to secure oscillating movements of the tube and the wiper element 12.

In order to start the device in operation, in the event that the tube 14 is stopped within the distance A of Fig. 3, where flow of air to the bore 38 would be cut off, a lever 54 is slidably mounted in the support 11 and arranged to be manually shifted against the tension of a spring 56 to bring downwardly directed arm 58 between spaced-apart ears 60 and 62 formed on the upper portion of the housing section 22. Thereafter, rotation of the lever 54 will rotate the housing sections 22 and 30 and the tube 14 sufficiently to cause communication to be established between the valve chambers 42 or 44 and the bore 46. As soon as this occurs, air pressure will be exhausted from the nozzle 16 and the device will continue the oscillating action referred to above.

In operation, and assuming that the parts have come to rest in the position illustrated in Fig. 1, to start the windshield wiper, it is only necessary to open the valve 28 and then manually move the housing sections 22 and 30, through manipulation of the lever 54, to a position where the chamber 44, for example, is connected with the bore 46. Air under pressure will thereupon be exhausted from the orifice 18 and the reactive force generated thereby will move the tube 14 to the right and about the shaft 20 as a pivot. At the limit of movement, illustrated in dotted lines in Fig. 1, the right hand end of the rack 52 will engage the stop 50 in order to reverse the position of the jet tube. As this reversal takes place the reactive force created by the air jet will be diminishing and hence the invention contemplates the utilization of the inertia of the oscillating parts to complete the reversal of the jet tube. As soon as such reversal is complete, the tube 14, wiper blade 12 and housing sections 22 and 30 will move in the opposite direction. When the parts pass through the distance A, see Fig. 3, while the flow of air is cut off for purposes of conservation, still the inertia of the parts will be sufficient to move the same to the position where chamber 42 is connected with the bore 46. The reaction accompanying the renewal of the air jet, thereupon continues the movement of the parts to the dotted line position where the left hand end of the rack 52 engages the stop 48. Here again, the inertia of the parts is sufficient to cause reversal of the position of the jet tube 14, through the cooperation between the rack 52 and the gear 32. As soon as the reversal is completed, the oscillating assembly moves to the right toward the position illustrated in Fig. 1. Thus the windshield wiper blade is oscillated back and forth without serious loss of air.

The present invention has thus provided a new and materially simplified windshield wiper construction which is highly efficient in operation and which oscillates at a substantially constant speed irrespective of variations in engine load. The reactive jet principle utilized, avoids the complicated and costly turbines and air motors of the prior art, and permits the use of relatively low cost and readily manufactured parts. While there is some loss of air, due to the exhausting to atmosphere, such loss is not material and may be lessened by employing the valvular arrangement which cuts off the air supply during a part of the oscillating travel.

While one embodiment of the invention has been illustrated and described herein with considerable particularity, it will be well understood by those skilled in the art that various modifications may be resorted to without departing from the spirit of the invention. Reference will therefore be had to the appended claims for a definition of the limits of the invention.

What is claimed is:

1. A windshield wiper comprising a support having a shaft fixedly mounted thereon, a housing pivotally mounted on the shaft, a windshield wiper blade secured to the housing, a reaction jet tube rotatably carried by the housing and having an angularly directed end portion provided with an orifice, means for supplying compressed air to said tube so that the reaction of the compressed air exhausted from the orifice will move the tube, housing and blade in one direction about said shaft when the tube occupies one position with respect to the housing, means for reversing the position of said tube with respect to the housing when the tube, housing and blade have moved to a selected position in said one direction in order to cause movement of the tube, housing and blade in the opposite direction, and means for again reversing the position of said tube with respect to the housing when the tube, housing and blade have moved to a selected position in said opposite direction so that the tube, housing and blade will again be moved in said one direction.

2. A windshield wiper comprising a support having a shaft fixedly mounted thereon, a housing surrounding said shaft and pivotally mounted thereon, a windshield wiper blade secured to the housing, and means for oscillating said housing and blade between selected limits, comprising a reaction jet tube rotatably carried by the housing, means for supplying compressed air to said tube, a gear carried by said tube, and means cooperating with said gear for reversing the position of said tube with respect to the housing at each of said selected limits.

3. A windshield wiper comprising a support having a shaft fixedly mounted thereon, a housing pivotally mounted on the shaft, a windshield wiper blade secured to the housing, a reaction jet tube rotatably carried by the housing and having an angularly directed end portion provided with an orifice, means for supplying compressed air to said tube so that the reaction of the compressed air exhausted from the orifice will move the tube, housing and blade in one direction about said shaft when the tube occupies one position with respect to the housing, a gear carried by said tube, means cooperating with said gear for reversing the position of said tube with respect to the housing when the tube, housing and blade have moved to a selected position in said one direction in order to cause movement of the tube, housing and blade in the opposite direction, and means cooperating with said gear for again reversing the position of said tube with respect to the housing when the tube, housing and blade have moved to a selected position in said opposite direction so that the tube, housing and blade will again be moved in said one direction.

4. A windshield wiper comprising a support having a shaft fixedly mounted thereon, a housing surrounding said shaft and pivotally mounted thereon, a windshield wiper blade secured to the housing, and means for oscillating said housing and blade between selected limits, comprising a reaction jet tube rotatably carried by the housing, means for supplying compressed air to said tube, means for reversing the position of said tube with respect to the housing at each of said selected limits, and means for interrupting the supply of compressed air to said tube for a predetermined arc of movement of the tube, housing and blade between said limits.

5. A windshield wiper comprising a support having a shaft fixedly mounted thereon, a housing pivotally mounted on the shaft, a windshield wiper blade secured to the housing, a reaction jet tube rotatably carried by the housing and having an angularly directed end portion provided with an orifice, means for supplying compressed air to said tube so that the reaction of the compressed air exhausted from the orifice will move the tube, housing and blade in one direction about said shaft when the tube occupies one position with respect to the housing, means for reversing the position of said tube with respect to the housing when the tube, housing and blade have moved to a selected position in said one direction in order to cause movement of the tube, housing and blade in the opposite direction, means for again reversing the position of said tube with respect to the housing when the tube, housing and blade have moved to a selected position in said opposite direction so that the tube, housing and blade will again be moved in said one direction, and means for interrupting the supply of compressed air to said tube for a predetermined arc of movement of the tube, housing and blade between said selected positions.

6. A windshield wiper comprising a support having a shaft fixedly mounted thereon, a housing pivotally mounted on the shaft, a windshield wiper blade secured to the housing, and means for oscillating said housing and blade between selected limits, comprising a reaction jet tube rotatably carried by the housing, means forming an axial bore in said shaft, one end of said bore being connected with a source of compressed air, a pair of passages extending radially outwardly from the other end of said bore to the outer surface of the shaft, means forming a bore in said housing for selectively connecting the jet tube with either of said passages adjacent said selected limits, and means for reversing the position of said tube with respect to the housing at each of said selected limits.

7. A windshield wiper comprising a support having a shaft fixedly mounted thereon, a housing surrounding said shaft and pivotally mounted thereon, a windshield wiper blade secured to the housing, and means for oscillating said housing and blade between selected limits, comprising a reaction jet tube rotatably carried by the housing, means for supplying compressed air to said tube, a gear carried by said tube, a rack carried by the housing and meshing with said gear, and a pair of spaced-apart stops for engaging and moving said rack for reversing the position of said tube with respect to the housing at each of said selected positions.

8. A windshield wiper comprising a support having a shaft fixedly mounted thereon, a housing pivotally mounted on the shaft, a windshield wiper blade secured to the housing, a reaction jet tube rotatably carried by the housing and having an angularly directed end portion provided with an orifice, means for supplying compressed air to said tube so that the reaction of the compressed air exhausted from the orifice will move the tube, housing and blade in one direction about said shaft when the tube occupies one position with respect to the housing, a gear carried by said tube, a rack carried by the housing and meshing with said gear, a stop engageable with said rack for moving the gear and reversing the position of said tube with respect to the housing when the tube, housing and blade have moved to a selected position in said one direction, and a second stop engageable with said rack for moving the gear and again reversing the position of said tube with respect to the housing when the tube, housing and blade have moved to a selected position in said opposite direction so that the tube, housing, and blade will again be moved in said one direction.

9. A windshield wiper comprising a support having a shaft fixedly mounted thereon, a housing pivotally mounted on the shaft, a windshield wiper blade secured to the housing, and means for oscillating said housing and blade between selected limits, comprising a reaction jet tube rotatably carried by the housing, valve means including a valve part carried by the shaft and a valve part carried by the housing for supplying compressed air to said tube, and means for reversing the position of said tube with respect to the housing at each of said selected limits.

10. A windshield wiper comprising a support having a shaft fixedly mounted thereon, a housing pivotally mounted on the shaft, a windshield wiper blade secured to the housing, and means for oscillating said housing and blade between selected limits, comprising a reaction jet tube rotatably carried by the housing, means forming an axial bore in said shaft, one end of said bore being connected with a source of compressed air, a pair of passages extending radially outwardly from the other end of said bore to the outer surface of the shaft, a pair of enlarged, spaced-apart chambers respectively connected with the outer ends of said passages, means forming a bore in said housing for selectively connecting the jet tube with either of said chambers adjacent said selected limits, and means for reversing the position of said tube with respect to the housing at each of said selected limits.

11. A windshield wiper as defined in claim 10 wherein the reversing means comprises a part carried by the tube, a second part cooperating with said first part and carried by the housing, and stop means alternately engageable by said second part to move the first part and tube relative to the housing.

12. A windshield wiper as defined in claim 10 wherein the reversing means comprises a gear carried by the tube, a rack meshing with the gear and slidably mounted in the housing, and stop means alternately engageable with opposite ends of said rack.

THOMAS J. TUREK.

REFERENCES CITED

The following references are of record in the file of this patent:

UNITED STATES PATENTS

| Number | Name | Date |
|---|---|---|
| 1,621,204 | Humphrey | Mar. 15, 1927 |
| 1,739,896 | Garbell | Dec. 17, 1929 |

FOREIGN PATENTS

| Number | Country | Date |
|---|---|---|
| 563,550 | Great Britain | Aug. 18, 1944 |